UNITED STATES PATENT OFFICE.

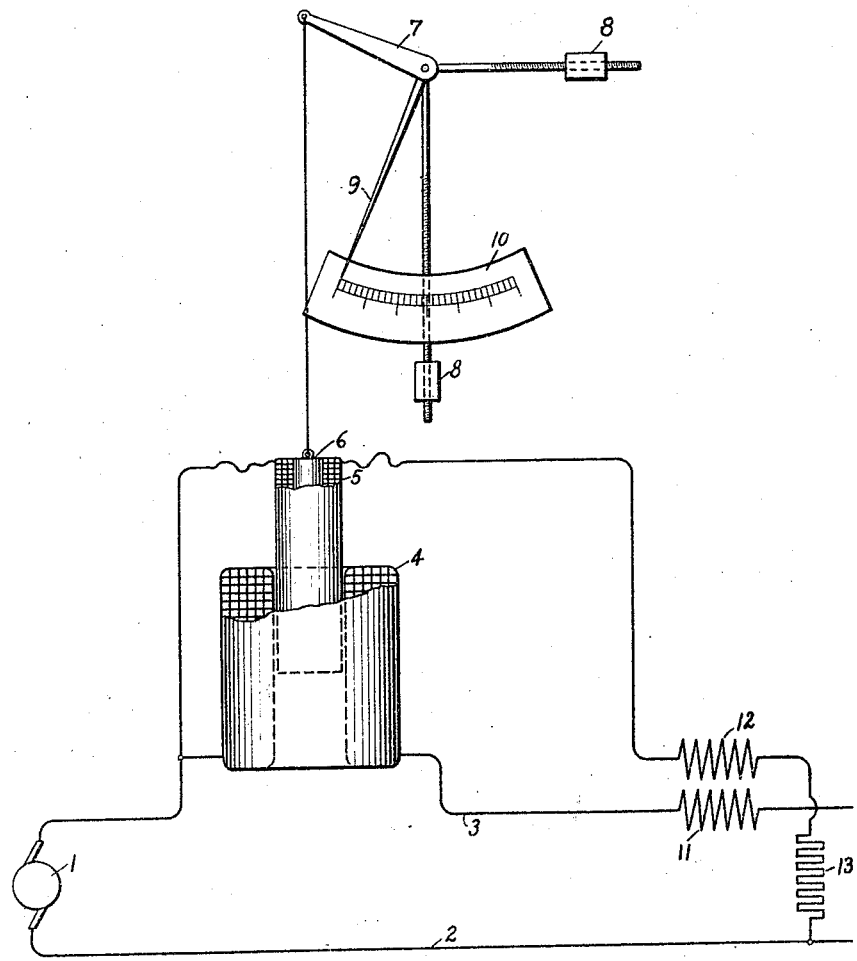

WILLIAM H. PRATT, OF LYNN, MASSACHUSETTS, ASSIGNOR TO GENERAL ELECTRIC COMPANY, A CORPORATION OF NEW YORK.

MEASURING INSTRUMENT.

1,000,941.  Specification of Letters Patent.  Patented Aug. 15, 1911.

Application filed February 7, 1910. Serial No. 542,458.

*To all whom it may concern:*

Be it known that I, WILLIAM H. PRATT, a citizen of the United States, residing at Lynn, county of Essex, State of Massachusetts, have invented certain new and useful Improvements in Measuring Instruments, of which the following is a specification.

My invention relates to electrical measuring instruments, particularly to alternating current measuring instruments such as wattmeters, in which coils connected in different circuits are so mounted in relation to each other that the mutual induction of the coils tends to change the phase relation between the currents in the coils and thereby introduce errors into the indications of the instrument, and the object of my invention is to provide a measuring instrument in which the effect of the mutual induction of the coils of the instrument is overcome and thereby phase displacement of the currents through the coils is prevented and the errors which arise from such phase displacement are eliminated.

In accordance with my invention, the circuits through those coils of the instrument which are so related that their mutual induction introduces errors into the indications of the instrument are inductively linked in any suitable manner, preferably by means of windings connected to the circuits of the coils and so related that their mutual induction counteracts the effect of the mutual induction of the coils of the instrument. The windings are preferably arranged in the form of a transformer with the primary connected in series with one coil of the instrument and the secondary connected in series with another coil of the instrument, the windings of the transformer being so proportioned that their mutual induction counteracts the mutual induction of the two instrument coils to which they are connected.

My invention will best be understood in connection with the accompanying drawing, which merely for purposes of illustration shows one of the various forms in which it may be embodied and in which the instrument embodying my invention is a wattmeter of the solenoid type.

In the particular arrangement shown in the drawing, an alternator 1 is connected to leads 2 and 3 of the alternating current circuit to which the instrument is connected. The instrument comprises a current coil 4 connected in series with the lead 3 and made in the form of a solenoid which acts upon a movable member comprising a potential coil 5 connected across the leads 2 and 3 and made in the form of a core for the solenoid, the coil 5 being preferably wound upon a suitable support or center 6 which is connected in any suitable way to an indicator 7 which is biased to zero position by means of weights 8, and is provided with an index 9 to swing over a scale plate 10.

Owing to the relative position of the series or current coil 4 and potential coil 5, the mutual induction between the coils is great and tends to produce in the currents through the two coils a phase displacement great enough to render the indications of the instrument inaccurate unless the effect of the mutual induction of the two coils is counteracted in some suitable manner. In accordance with my invention the mutual induction of the coils 4 and 5 is overcome by rendering the potential circuit through the coil 5 and the current circuit through the series coil 4 mutually dependent by means of some suitable device which will inductively link the circuits of the two coils to each other and thereby counteract the effect produced by the mutual induction of the coils 4 and 5. The preferred arrangement for counteracting the effect of the mutual induction of the coils 4 and 5 comprises a winding 11 connected in series with the series coil 4 and placed in inductive relation to a winding 12 which is connected in the potential circuit in series with the potential coil 5. A non-inductive resistance 13 keeps the amount of current through the inductive coil 5 and the winding 12 within proper limits.

The windings 11 and 12 may have any suitable proportions and relation, but are preferably made in the form of a transformer of which the winding 11 in series with the current coil 4 is the primary and the winding 12 in series with the potential coil 5 is the secondary. The winding 11 produces in the winding 12 an effect dependent upon the current through the winding 11 and of sufficient amount to modify the flow of current through the potential circuit and potential coil 5 to such an extent that phase displacement by the mutual induction of the coils 4 and 5 is prevented and the effect of the mutual induction of the two coils 4 and 5 is entirely overcome. Since phase displacement of the currents through the current and potential coils of the instrument is prevented, the instrument is free from the errors heretofore present in instruments of this type and the indications of the instrument are rendered substantially accurate.

My invention may be embodied in many other forms than that shown and described, and I therefore do not desire to limit myself to the precise arrangement disclosed, but aim in the appended claims to cover all modifications within the spirit and scope of my invention.

What I claim as new and desire to secure by Letters Patent of the United States, is,—

1. In a measuring instrument, the combination with two members mounted to move relatively to each other and two current carrying coils which coöperate to produce relative movement of said members and are mounted in inductive relation to each other, of means dependent on current through one coil for controlling the current through the other coil to maintain the currents through both coils in proper phase relation.

2. In a measuring instrument, the combination with two members mounted for relative movement and two current carrying coils mounted to coöperate and thereby produce relative movement of said members, said coils being in inductive relation to each other, of means responsive to current through one of said coils for impressing on the circuit of the other coil an electro-motive force sufficient to counteract the mutual induction of said coils and thereby prevent phase displacement of the currents in said coils.

3. In a measuring instrument, the combination with two relatively movable members and two coöperating current carrying coils for producing relative movement of said members, said coils being in inductive relation to each other, of means whereby the circuits through said coils are inductively linked to prevent phase displacement by the currents through said coils.

4. In a measuring instrument, the combination with two relatively movable members each having a coil and said coils being in inductive relation to each other, of a winding in series with each of said coils, said windings being inductively related to prevent phase displacement of the currents through said coils.

5. In a measuring instrument, the combination with two relatively movable members, one having a series coil and the other a potential coil and said coils being in inductive relation to each other, of a transformer having its primary winding in series with said series coil and its secondary in series with said potential coil to prevent phase displacement of the currents in said coils.

6. The combination with a series solenoid and a movable core comprising a potential coil, of two windings inductively related and connected in series with said potential coil and said solenoid respectively.

7. In a measuring instrument, the combination with a series solenoid and a movable core comprising a potential coil, of a primary winding in series with said solenoid and a secondary winding in inductive relation to said primary winding and connected in series with said potential coil to counteract the mutual induction of said solenoid and said potential coil.

In witness whereof, I have hereunto set my hand this second day of February, 1910.

WILLIAM H. PRATT.

Witnesses:
JOHN A. MCMANUS, Jr.,
CHARLES A. BARNARD.